(12) United States Patent
Aoki

(10) Patent No.: US 11,622,023 B2
(45) Date of Patent: Apr. 4, 2023

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Hitoshi Aoki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/353,931

(22) Filed: Mar. 14, 2019

(65) Prior Publication Data

US 2019/0222661 A1     Jul. 18, 2019

Related U.S. Application Data

(63) Continuation of application No. PCT/JP2017/032677, filed on Sep. 11, 2017.

(30) Foreign Application Priority Data

Sep. 15, 2016     (JP) .............................. JP2016-180326

(51) Int. Cl.
    *H04L 67/56*           (2022.01)
    *H04W 84/12*         (2009.01)
            (Continued)

(52) U.S. Cl.
    CPC .............. *H04L 67/56* (2022.05); *H04L 67/51* (2022.05); *H04W 48/10* (2013.01); *H04W 52/02* (2013.01);
            (Continued)

(58) Field of Classification Search
    CPC ........ H04L 67/16; H04L 67/28; H04W 48/10; H04W 52/02; H04W 68/005;
            (Continued)

(56) References Cited

U.S. PATENT DOCUMENTS 9,949,156 B2 *   4/2018   Patil ...................... H04W 76/14
10,200,826 B2 *   2/2019   Park ..................... H04L 67/322
(Continued)

FOREIGN PATENT DOCUMENTS

CN        101283336 A     10/2008
CN        101529858 A      9/2009
(Continued)

*Primary Examiner* — Azizul Choudhury
(74) *Attorney, Agent, or Firm* — Canon U.S.A., Inc. I.P. Division

(57) ABSTRACT

A communication apparatus includes a function for performing transmission and reception of a wireless signal in a period having a predetermined length which arrives at a predetermined time interval, a function for performing at least one process of the transmission and the reception of the wireless signal in the period as a substitute for a particular communication apparatus belonging to a set of a plurality of communication apparatuses among which the period is synchronized, and a function for deciding whether or not proxy processing is to be performed in accordance with a frequency of periods during which the communication apparatus performs the transmission and the reception of the wireless signal among a plurality of the periods.

6 Claims, 13 Drawing Sheets

(51) Int. Cl.
  *H04W 84/20* (2009.01)
  *H04W 92/18* (2009.01)
  *H04W 52/02* (2009.01)
  *H04W 48/10* (2009.01)
  *H04L 67/51* (2022.01)
  *H04W 68/00* (2009.01)
  *G06F 3/12* (2006.01)

(52) U.S. Cl.
  CPC ......... *H04W 68/005* (2013.01); *H04W 84/12* (2013.01); *H04W 84/20* (2013.01); *H04W 92/18* (2013.01); *G06F 3/1226* (2013.01); *G06F 3/1292* (2013.01); *Y02D 30/70* (2020.08)

(58) Field of Classification Search
  CPC ..... H04W 84/12; H04W 84/20; H04W 92/18; Y02D 30/70; G06F 31/226; G06F 31/1292
  See application file for complete search history.

(56) References Cited

U.S. PATENT DOCUMENTS

| | | | |
|---|---|---|---|
| 10,433,353 B2* | 10/2019 | Yong | H04W 76/14 |
| 2008/0077651 A1 | 3/2008 | Lee | |
| 2010/0034143 A1* | 2/2010 | Cordeiro | H04W 48/08 |
| | | | 370/328 |
| 2013/0237259 A1 | 9/2013 | Umehara | |
| 2014/0254569 A1 | 9/2014 | Abraham | |
| 2014/0269555 A1 | 9/2014 | Sadasivam | |
| 2014/0302787 A1 | 10/2014 | Rantala | |
| 2014/0341073 A1* | 11/2014 | Abraham | H04W 8/005 |
| | | | 370/254 |
| 2015/0081840 A1 | 3/2015 | Patil | |
| 2015/0350027 A1 | 12/2015 | Raissinia | |
| 2015/0350866 A1* | 12/2015 | Patil | H04W 40/244 |
| | | | 370/254 |
| 2016/0112987 A1 | 4/2016 | Patil | |
| 2016/0226928 A1 | 8/2016 | Park et al. | |
| 2016/0270137 A1* | 9/2016 | Yong | H04W 8/005 |
| 2016/0353269 A1* | 12/2016 | Kasslin | H04W 8/005 |
| 2019/0098680 A1* | 3/2019 | Park | H04L 67/51 |

FOREIGN PATENT DOCUMENTS

| | | |
|---|---|---|
| CN | 103916936 A | 7/2014 |
| CN | 104202308 A | 12/2014 |
| CN | 104349285 A | 2/2015 |
| CN | 104967977 A | 10/2015 |
| CN | 105075302 A | 11/2015 |
| CN | 105580400 A | 5/2016 |
| CN | 105900395 A | 8/2016 |
| EP | 1190528 A2 | 3/2002 |
| EP | 2835915 A2 | 2/2015 |
| JP | 2013-187703 A | 9/2013 |
| JP | 2014509156 A | 4/2014 |

\* cited by examiner

FIG. 9

| BATTERY REMAINING AMOUNT | FREQUENCY OF RECEPTION DW |
|---|---|
| 100% - 70% | DW0 - DW15 |
| 69% - 50% | DW0/DW2/DW4/DW6/DW8/DW10/DW12/DW14 |
| 49% - 30% | DW0/DW4/DW8/DW12 |
| 29% - 1% | DW0 |

FIG. 12

| SERVICE | Publish/Subscribe | TRANSMISSION AND RECEPTION FREQUENCY |
|---|---|---|
| CHAT (WHEN ACTIVE) | Publish | 1 sec |
| CHAT (BACKGROUND) | Publish | 5 sec |
| COUPON | Subscribe | 5 sec |

FIG. 13

| SERVICE | ENABLING/DISABLING OF Proxy Server FUNCTION | TRANSMISSION AND RECEPTION FREQUENCY |
|---|---|---|
| CHAT (WHEN ACTIVE) | ENABLED | 1 sec |
| CHAT (BACKGROUND) | DISABLED | 5 sec |
| COUPON | DISABLED | 5 sec |

COMMUNICATION APPARATUS, COMMUNICATION METHOD, AND STORAGE MEDIUM

CROSS-REFERENCE TO RELATED APPLICATIONS

This application is a Continuation of International Patent Application No. PCT/JP2017/032677, filed Sep. 11, 2017, which claims the benefit of Japanese Patent Application No. 2016-180326, filed Sep. 15, 2016, both of which are hereby incorporated by reference herein in their entirety.

TECHNICAL FIELD

The present invention relates to a communication technique.

BACKGROUND ART

In recent years, a wireless LAN represented by IEEE802.11 standard series has been widely used. A network is controlled by a base station that is called access point (AP) in the wireless LAN in many cases. This AP and a station (STA) that exists within a radio wave reaching range of the AP and is in a wirelessly connected state constitute a wireless network.

In addition, not only the simple wireless network configuration based on the AP and the STA of the above-described related-art type but also products in various wireless LAN network modes and specifications and standards have appeared. PTL 1 describes NAN (Neighbor Awareness Networking) stipulated by Wi-Fi Alliance as the standard for discovering a communication apparatus, a service provided by it, or the like in a power saving manner. This is intended to achieve the power saving by shortening a time for enabling a wireless RF (Radio Frequency) unit while a period during which the communication apparatus performs information exchange with another communication apparatus is synchronized with the other communication apparatus. This period for the synchronization in the NAN is referred to as DW (Discovery Window). In addition, a set of NAN devices that share a predetermined synchronization period is referred to as a NAN cluster. Terminals having functions as a Master and a Non-Master Sync among the NAN devices transmit a Sync Beacon corresponding to a signal for securing the synchronization between the terminals in the DW period. After the synchronization with the other terminal is established, the NAN device transmits and receives a Subscribe message corresponding to a signal for discovering the service, a Publish message corresponding to a signal for notifying that the service is provided, and the like in the DW period. Furthermore, the NAN device can transmit and receive a Follow-up message for exchanging additional information with regard to the service in the DW period. On the other hand, the NAN device can also enter a DOZE state corresponding to a state in which a wireless signal is not received in part of the DW periods, and it is possible to further reduce power consumption.

A frequency of the DW periods during which the wireless signal is received among the DW periods relies on the NAN device. However, all of the NAN devices that participate in the NAN cluster need to be in a state (hereinafter, referred to as an AWAKE state) in which the wireless signal can be certainly received in a particular DW period called DW0. The DW0 is a DW period at a cycle which comes in once every 16 DW periods. In addition, the DW0 is a DW period that starts from a time when low 23 bits of TSF (Time Synchronization Function) corresponding to a counter timer used by the NAN cluster for the synchronization are 0x0. In addition, since the NAN devices operating as the Master and the Non-Master Sync need to transmit the Sync Beacon in every DW period, the wireless signal can be received in all of the DW periods.

On the other hand, the NAN device that does not transmit the Sync Beacon in every DW period functions as a Non-Master Non-Sync and does not need to be in the AWAKE state in all of the DW periods and may be in the AWAKE state at least in the DW0.

A method has been proposed in which the service of the communication apparatus located in a range where its own wireless signal cannot reach is discovered or its own service is discovered other way around by requesting the other communication apparatus to perform the search or provision of the service (PTL 2). According to this, for example, the communication apparatus (hereinafter, referred to as a Proxy Server) on a receiving side of the proxy request is notified of the information related to the service provided by the communication apparatus on an issuing side of the proxy request (hereinafter, which will be referred to as a Proxy Client) and the period during which the Proxy Client is awake. When the Proxy Server is requested to perform by proxy, the Proxy Server performs a notification of the existence of the service by proxy as a substitute for the Proxy Client for a query of the service from the other communication apparatus. At this time, by performing the notification of the information with regard to the service and the period during which the Proxy Client is awake, the other communication apparatus can detect the existence of the service on the basis of the information. In addition, in a case where the apparatus is located at a distance where the communication can be performed with the Proxy Client, when the Proxy Client is notified of the message in the period during which the Proxy Client is awake, the service can be discovered.

CITATION LIST

Patent Literature

PTL 1: U.S. Patent Application Publication No. 2014/0302787

PTL 2: U.S. Patent Application Publication No. 2015/0081840

SUMMARY OF INVENTION

When the NAN device is in the DOZE state in the DW period, the NAN device cannot transmit or receive the Subscribe message and the Publish message in the period. For this reason, the Proxy Server is preferably in the AWAKE state in all of the DWs as much as possible. On the other hand, it is not preferable that the NAN device desired to be in the DOZE state in part of the DWs from the viewpoint of power consumption operates as the Proxy Server and is put in the AWAKE state in all of the DWs.

The present invention has been made in view of the above-described issue and is aimed at providing a technique with which it is possible to appropriately decide whether or not the communication apparatus operates as the Proxy Server. To address the above-described issue, a communication apparatus according to the present invention includes a communication unit configured to perform transmission and reception of a wireless signal in one or more periods having a predetermined length which arrive at a predetermined time interval, a processing unit configured to perform at least one process of the transmission and the reception of the wireless signal in the period as a substitute for a particular communication apparatus belonging to a set of a plurality of communication apparatuses among which the period is synchronized, and a decision unit configured to decide whether or not proxy processing by the processing unit is to be performed in accordance with a frequency of periods during which the communication unit performs the transmission and the reception of the wireless signal among the plurality of periods.

Further features of the present invention will become apparent from the following description of exemplary embodiments with reference to the attached drawings.

BRIEF DESCRIPTION OF DRAWINGS

FIG. 9 illustrates an example of a relationship between a battery remaining amount and a reception DW frequency.

FIG. 12 illustrates an example of a relationship between a service and a transmission and reception frequency of the service.

FIG. 13 illustrates an example of a table representing a correlation between an activated service and enabling/disabling of the Proxy Server function.

DESCRIPTION OF EMBODIMENTS

Figure 1:
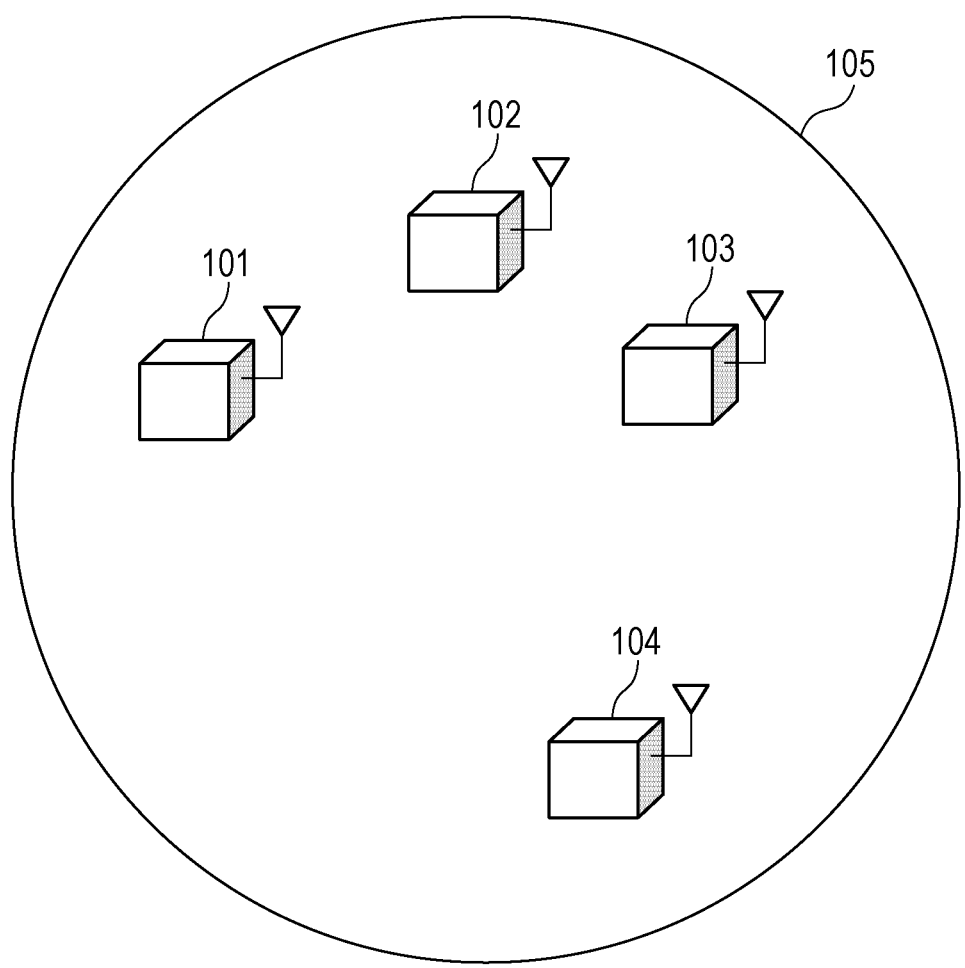
FIG. 1 illustrates a configuration example of a wireless communication system.

Hereinafter, embodiments of the present invention will be described with reference to the drawings. It should be noted that, hereinafter, respective communication apparatuses are set as terminals including a communication function of the wireless LAN in conformity to the IEEE802.11 standard series but are not limited to this. In addition, the following respective communication apparatuses are set as NAN devices that can discover another communication apparatus and a service provided by the other communication apparatus by Wi-Fi Neighbor Awareness Networking (NAN) but are not also limited to this. That is, technical terms corresponding to predetermined standards are used in the following respective descriptions, but the following respective discussions can also be applied to other standards of the same type.

Descriptions will be provided of the NAN. According to the NAN, service information is communicated in a period called Discovery Window (hereinafter, referred to as DW). The DW corresponds to a time and a channel where a plurality of devices that execute the NAN converge. In addition, a set of terminals that share a schedule of the DW will be referred to as a NAN cluster.

Each of the terminals belonging to the NAN cluster operates as any one of a Master, a Non-Master Sync, and a Non-Master Non-Sync. The terminal operating as the Master transmits a Synchronization Beacon (hereinafter, referred to as a Sync Beacon) corresponding to a beacon for each of the terminals to identify the DW and establish the synchronization. In addition, the terminal operating as the Master transmits a Discovery Beacon corresponding to a signal for the terminal that does not belong to the NAN cluster to recognize the NAN cluster. The Discovery Beacon is transmitted every 100 TU (Time Unit, 1 TU corresponds to 1024 microseconds) even outside the DW period, for example. It should be noted that at least one terminal in each of the NAN clusters operates as the Master.

The terminal operating as the Non-Master Sync transmits the Sync Beacon but does not transmit the Discovery Beacon. The terminal operating as the Non-Master Non-Sync does not the Sync Beacon or the Discovery Beacon.

The terminals that participate in the NAN cluster synchronize the DW period every predetermined cycle in accordance with the Sync Beacon and communicate the service information in the DW period.

The respective terminals mutually communicate a Subscribe message corresponding to a signal for discovering the service and a Publish message corresponding to a signal for notifying that the service is provided in the DW period. Furthermore, the respective terminals can interchange a Follow-up message for exchanging additional information with regard to the service in the DW period. It should be noted that messages such as Publish, Subscribe, and Follow-up will be collectively referred to as Service Discovery Frame (SDF). The respective terminals interchange the SDF and can perform advertisement and detection of the service.

As described above, the NAN device is put into the DOZE state even in the DW period corresponding to a state in which the wireless signal is not transmitted and received, and it is possible to suppress the power consumption. On the other hand, the above-described NAN device cannot perform the transmission and the reception of the Subscribe message and the Publish message in the DW period during which the NAN device is in the DOZE state. For this reason, a period during which the service provided by the NAN device is discovered by the other NAN device may be lengthened.

In contrast to this, depending on the NAN device, it may be possible to request the other NAN device to perform the search and the announcement of the service such as Subscribe and Publish. Herein, a particular NAN device that processes the search and the announcement of the service of the other NAN device by proxy will be referred to as a Proxy Server, and a particular NAN device that requests the other NAN device to perform the proxy processing will be referred to as a Proxy Client. In a case where the proxy transmission of the service information is requested from the Proxy Client, the Proxy Server transmits the service information of the Proxy Client by proxy. When the Proxy Server executes the search and the announcement of the service as a substitute for the Proxy Client, the Proxy Client enters the DOZE state in still more periods, and it is possible to substantially suppress the power consumption. In addition, for the NAN device that searches for the service provided by the Proxy Client, even when the Subscribe message is transmitted when the Proxy Client is in the DOZE state, the Proxy Server may return a response in some cases. For this reason, even when the Proxy Client is in the DOZE state, a possibility that the NAN device that searches for the service can discover the service provided by the Proxy Client is increased since the Proxy Server responds by proxy.

However, when the Proxy Server requested to perform the proxy processing of the search and the announcement of the service from the Proxy Client frequently enters the DOZE state, the period during which the proxy processing of the search and the announcement of the service of the Proxy Client is performed is shortened. For this reason, the above-described inconvenience can be eliminated when the Proxy Server is set to be in the AWAKE state in as many DWs as possible. On the other hand, in a case where the function of the Proxy Server is included but in a state in which the Proxy request is not received, it is not necessary to set AWAKE in many DWs, and the power consumption can be reduced by being rather in the DOZE state.

Herein, a case will be considered where the plurality of Proxy Clients make the Proxy request. In a case where each makes the request to the separate Proxy Server, when the number of DWs during which each of the Proxy Servers is AWAKE is increased, the service for which the Proxy request is made is more likely to be discovered by the other NAN device. On the other hand, when each of the Proxy Servers that have received the Proxy request individually increases the number of DWs during which the wireless communication can be performed, there is a possibility that an efficiency of the power consumption may be deteriorated in the NAN cluster as a whole.

In addition, the Proxy Server that does not need to be in the AWAKE state is in the AWAKE state in many DWs to perform the search and the announcement of the service as a substitute for the other NAN device, there is a possibility that the power consumption related to the radio wave may be increased.

Therefore, according to the present embodiment, in a case where the NAN device operates as the Master or the Non-Master Sync, control is performed so as to enable the function as the Proxy Server. On the other hand, in a case where the NAN device operates as the Non-Master Non-Sync, control is performed so as to disable the function as the Proxy Server. That is, the NAN device operates as the Proxy Server in a case where the NAN device needs to be in the AWAKE state in all of the DWs. On the other hand, in a case where the NAN device does not need to be in the AWAKE state in all of the DWs, the NAN device does not operate as the Proxy Server and is put into the DOZE state in part of the DWs to realize the reduction in the power consumption. Hereinafter, the NAN device that operates as the Master or the Non-Master Sync will be referred to as a Beaconing device, and the NAN device that operates as the Non-Master Non-Sync will be referred to as a Non-Beaconing device. In addition, in the following descriptions, a substitute will be referred to as a Proxy, and the request for substitute processing will be referred to as a Proxy request.

Hereinafter, after configurations of a wireless communication system and a communication apparatus common to the respective embodiments will be described, a flow of processes according to the respective embodiments will be described.

(Configuration of the Wireless Communication System)

First, a configuration example of the wireless communication system according to the present embodiment will be described by using FIG. 1. The wireless communication system according to the present embodiment is constituted by including a NAN device 101 to a NAN device 104 in which each of the NAN devices is in conformity to the NAN standard, and the NAN devices 101 to 104 participate in the NAN cluster 105. The NAN devices (the NAN devices 101 to 104) that participate in the NAN cluster 105 constitute a network in a frequency channel 6 (6 ch). Herein, the NAN cluster 105 is a NAN cluster in which a length of the DW period is 16 TU, and also a time interval from a starting timing of the DW period to a starting timing of the next DW period is 512 TU. In addition, the DW period is a period in which 16 DW periods including the DW0 to the DW15 is set as one cycle, and the DW period after 16 DWn (n denotes an integer from 0 to 15) is also the DWn. It is configured that all of the NAN devices that participate in the NAN cluster 105 are certainly in the AWAKE state in the DW0 so that the wireless signal can be received.

The NAN device 101 or the NAN device 104 is a communication apparatus that can execute the respective processes which will be described below. The NAN device 101 can discover surrounding communication apparatuses and services that are provided by those surrounding communication apparatuses on the basis of the NAN standard and provide the information of the service that can be provided by its own device. In addition, the NAN device 101 can operate as the Proxy Server that can perform the search and the announcement of the service of the other NAN device by proxy. It is assumed that the NAN device 101 participates in the NAN cluster 105 as the Master immediately after the activation.

The NAN device 102 is a communication apparatus that participates in the NAN cluster 105 as the Non-Master Non-Sync. The NAN device 102 further includes a function as a printer and makes an announcement of a print service to the other NAN device. The NAN device 102 includes a function of the Proxy Client and can request for the announcement of the service by proxy when the Proxy Server is discovered. In a case where the announcement of the service is made by its own device, that is, a case where the Proxy is not requested, the NAN device 102 receives the wireless signal in all of the DW periods. On the other hand, in a case where the Proxy is not requested, the NAN device 102 receives the wireless signal only in the DW0.

The NAN device 103 is a communication apparatus that participates in the NAN cluster 105 as the Non-Master Non-Sync. The NAN device 103 searches for the print service by an instruction from the user of the NAN device 103 which is not illustrated in the drawing. That is, it is configured that the NAN device 102 is a Publisher that provides a predetermined service that is searched for by the NAN device 103, and the NAN device 103 is a Subscriber that searches for the predetermined service announced by the NAN device 102.

The NAN device 104 is a NAN device having the Proxy Server function similarly as in the NAN device 101. The NAN device 104 is set to have a higher Master Rank than the NAN device 101. The Master Rank is a parameter stipulated by the NAN standard corresponding to respective likelihoods to be the Master, the Non-Master Sync, and the Non-Master Non-Sync in the NAN cluster. Specifically, the Master Rank is decided by the following expression from a Master Preference set for each NAN device, a Random Factor corresponding to a random value, and an MAC of an interface address.

Master Rank=Master Preference*2^56+ Random Factor*2^48+MAC[5]*2^40+ . . . +MAC[0]. As the NAN device has a higher Master Rank, the NAN device is more likely to have the role as the Master, and as the NAN device has a lower Master Rank, the NAN device is more likely to have the role as the Non-Master Non-Sync. In particular, the NAN device having the highest Master Rank in the NAN cluster is a device called Anchor Master corresponding to a reference of the time in the NAN cluster. In the NAN standard, the NAN device that stably participates in the NAN cluster such as, for example, the NAN device that is driven by a commercial power source and is unlikely to be moved in position is recommended to have a higher Master Rank. In addition, the NAN device that is driven by a battery in which there is a possibility that the NAN device may not stably exist in the NAN cluster like a mobile terminal is recommended to have a lower Master Rank. When the stably remaining NAN device becomes the Master and transmits the synchronization signal, it is possible to stably maintain the NAN cluster.

That is, the Master Preference is a value used for deciding the apparatus that has the role for transmitting the Sync Beacon, and the apparatus having the higher Master Preference value is more likely to be set as the Master. The NAN devices 101 to 104 are put into the DOZE state in the DW period during which the wireless signal is not transmitted and received without supplying the power to the communication unit.

(Configuration of the NAN Device 101 or the NAN Device 104)

Figure 2:
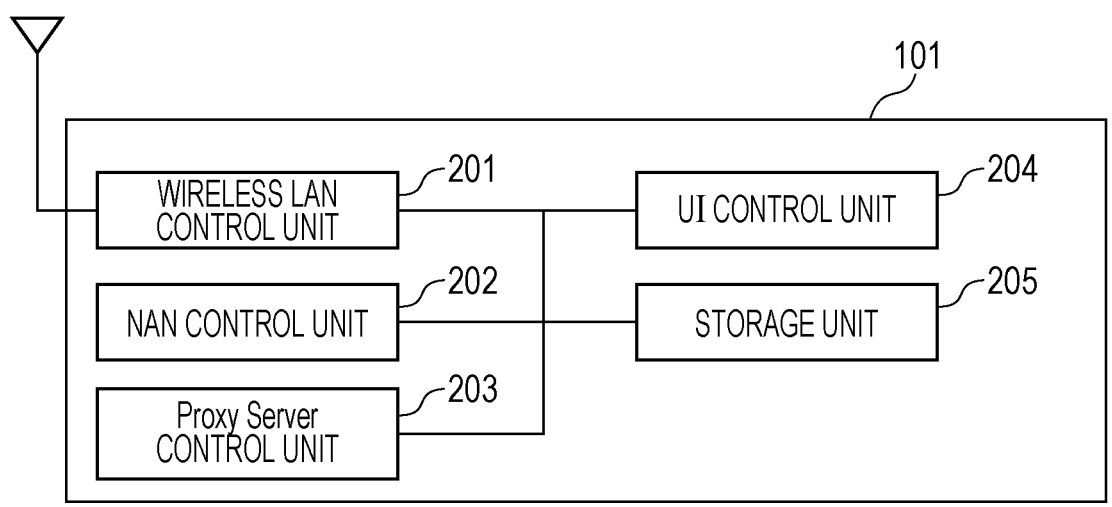
FIG. 2 is a block diagram of illustrating a functional configuration example of a NAN device 101.

FIG. 2 is a block diagram illustrating a function configuration example of the NAN device 101. The NAN device 101 or the NAN device 104 includes, for example, a wireless LAN control unit 201, a NAN control unit 202, a Proxy Server control unit 203, a UI control unit 204, and a storage unit 205 as its functional configuration.

The wireless LAN control unit 201 is constituted by including an antenna and a circuit for performing the transmission and the reception of the wireless signal with the other wireless LAN apparatus and a program for controlling those components. The wireless LAN control unit 201 executes the communication control of the wireless LAN in accordance with the IEEE802.11 standard series. The NAN control unit 202 is constituted by including a program for performing control in accordance with the NAN standard and hardware. The Proxy Server control unit 203 controls the NAN control unit 202 to realize the Proxy function for performing the search and the announcement of the service of the other NAN device by proxy. The UI control unit 204 is constituted by including hardware related to user interfaces such as a touch panel and a button for accepting an operation on the NAN device 101 by the user, who is not illustrated in the drawing, of the NAN device 101 and a program for controlling those components. It should be noted that the UI control unit 204 also includes a function for presenting information to the user such as, for example, display of an image or the like or sound output. The storage unit 205 is a storage device that may be constituted by a ROM, a RAM, or the like that saves a program by which the NAN device 101 is operated and data.

Figure 3:
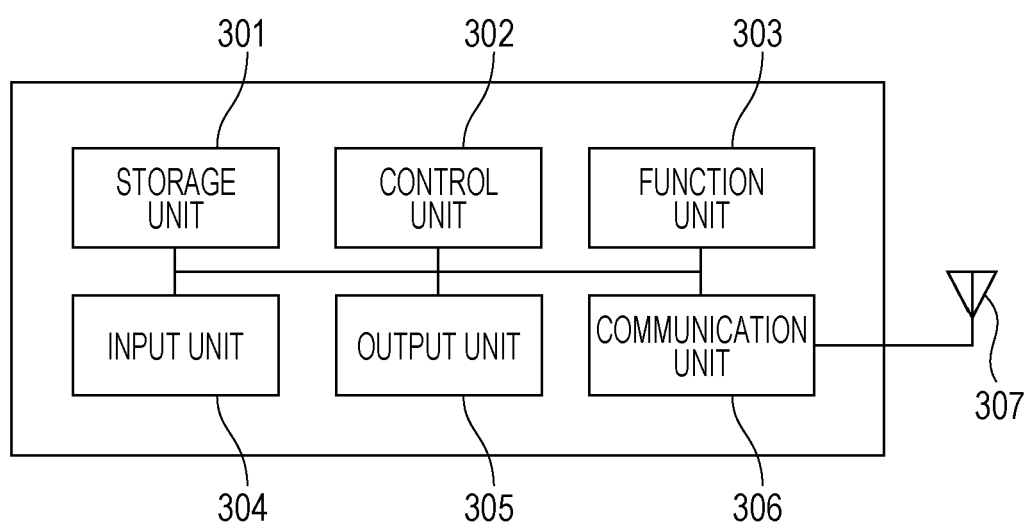
FIG. 3 is a block diagram of illustrating a hardware configuration example of the NAN device 101.

FIG. 3 illustrates a hardware configuration of the NAN device 101 according to the present embodiment. The NAN device 101 includes a storage unit 301, a control unit 302, a function unit 303, an input unit 304, an output unit 305, a communication unit 306, and an antenna 307 as an example of its hardware configuration.

The storage unit 301 is constituted by both or one of the ROM and the RAM and stores programs for performing various operations which will be described below and various information such as communication parameters for the wireless communication. It should be noted that a storage medium such as a flexible disc, a hard disc, an optical disc, an opto-magnetic disc, a CD-ROM, a CD-R, a magnetic tape, a non-volatile memory card, or a DVD may be used as the storage unit 301 in addition to the memory such as the ROM or the RAM.

The control unit 302 is constituted by one or more CPUs or MPUs and controls the entirety of the NAN device 101 by executing the programs stored in the storage unit 301. It should be noted that the control unit 302 may control the entirety of the NAN device 101 in cooperation between the programs and the OS (Operating System) stored in the storage unit 301.

In addition, the control unit 302 controls the function unit 303 to execute the predetermined processing such as image pickup, printing, and projection. The function unit 303 is hardware for the NAN device 101 to execute the predetermined processing. For example, in a case where the NAN device 101 is a camera, the function unit 303 is a capturing unit and performs image pickup processing. In addition, for example, in a case where the NAN device 101 is a printer, the function unit 303 is a printing unit and performs printing processing. In addition, for example, in a case where the NAN device 101 is a projector, the function unit 303 is a projection unit and performs projection processing. The data processed by the function unit 303 may be the data stored in the storage unit 301 or data communicated with the other communication apparatus via the communication unit 306 which will be described below.

The input unit 304 accepts various operations from the user. The output unit 305 performs various outputs to the user. Herein, the output by the output unit 305 includes at least one of display on the screen, sound output by a speaker, vibration output, and the like. It should be noted that both the input unit 304 and the output unit 305 may be realized by a single module like a touch panel.

The communication unit 306 performs control on the wireless communication in conformity to the IEEE802.11 standard series and control on an IP communication. In addition, the communication unit 306 controls an antenna 307 to perform the transmission and the reception of the wireless signal for the wireless communication. The NAN device 101 communicates contents such as image data, document data, or video data with the other communication apparatus via the communication unit 306.

(Processing Flow)

Subsequently, several embodiments such as a flow of the processing executed by the NAN device 101 or 104 described above and a sequence in the wireless communication system will be described.

First Embodiment

According to the present embodiment, the NAN device 101 or 104 determines whether or not the NAN device itself operates as the Proxy Server of the other communication apparatus. Specifically, the NAN device itself operates as the Proxy Server in a case where the NAN device itself operates as the Beaconing device in the NAN cluster. In a case where the NAN device itself operates as the Non-Beaconing device, the operation as the Proxy Server is stopped, and the wireless signal is transmitted and received only in the DW0 to reduce the power consumption. In this manner, since the frequency for being put into the DOZE state is decreased when the NAN device 101 operates as the Proxy Server, the other device is set to be able to promptly perform the notification of the service information of the device that requests the NAN device 101 to perform the proxy transmission of the service information. In addition, since the Beaconing device needs to be in the AWAKE state in all of the DWs, the efficiency in the power consumption can be increased while the device operates as the Proxy Server only at this time.

Figure 4:
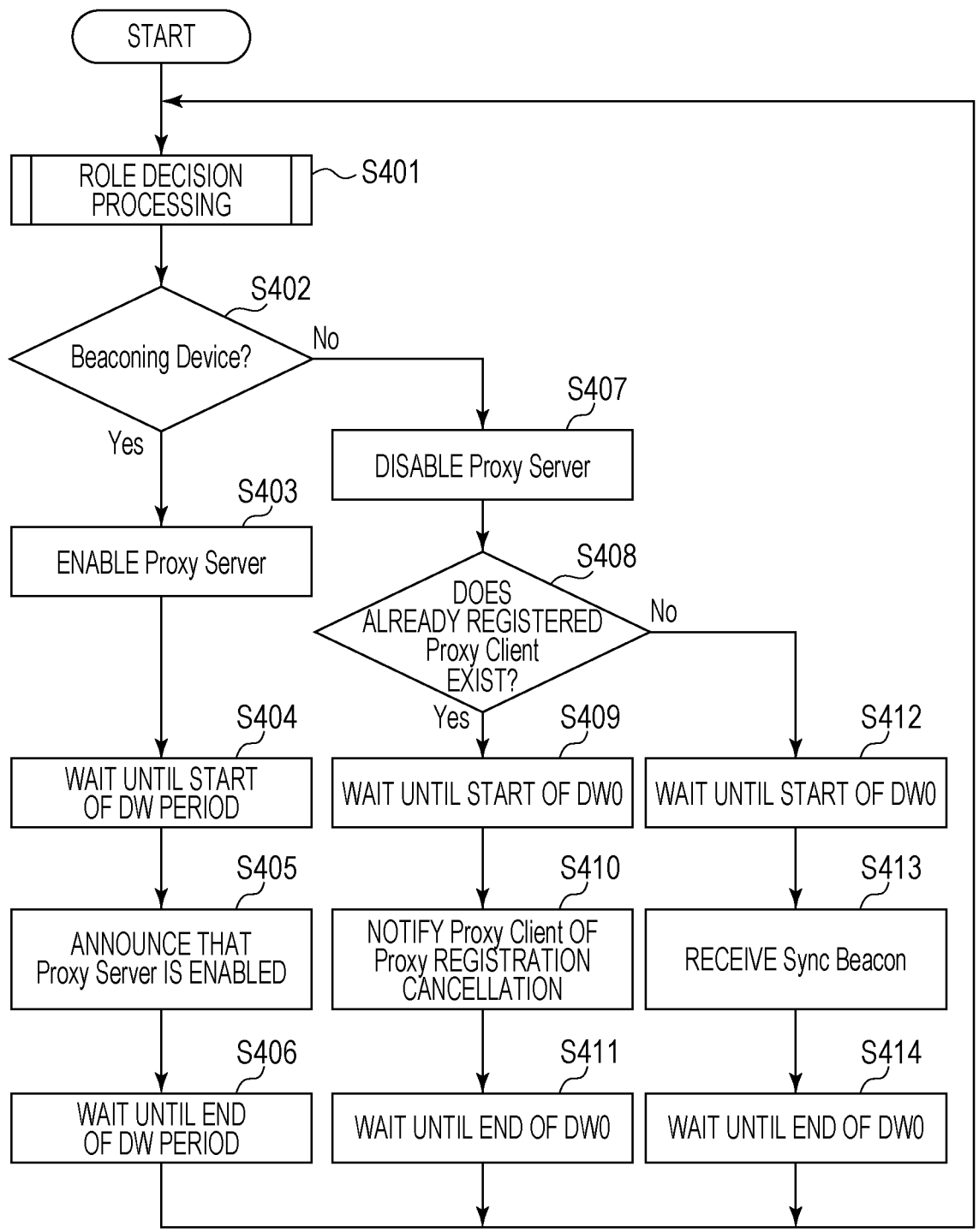
FIG. 4 is a flow chart illustrating a first example in which enabling/disabling of a Proxy Server is switched.

FIG. 4 is a flow chart illustrating an example of a flow of the processing for deciding whether the Proxy Server function in the NAN device 101 is enabled or disabled. The present processing is executed when the NAN device 101 participates in the NAN cluster 105. Hereinafter, the descriptions will be provided as the NAN device 101, but similar processing is also applied to the NAN device 104. In addition, the flow chart illustrated in FIG. 4 illustrates a flow of the processing performed when the control unit 302 of the NAN device 101 reads out and executes the computer programs stored in the storage unit 301. It should be noted a configuration may also be adopted in which part or all of the steps illustrated in the flow chart illustrated in FIG. 4 is realized by hardware such as, for example, an ASIC (Application Specific Integrated Circuit).

When the processing is started, the NAN device 101 executes role decision processing in the NAN cluster 105 (S401). According to this, the decision is made for the device to become which one of the Master, the Non-Master Sync, and the Non-Master Non-Sync in the NAN cluster 105 on the basis of the NAN specification.

Next, as a result of the role decision in S401, it is determined whether or not the device is the Beaconing device (S402). The Beaconing device refers to a device that transmits the Sync Beacon in the DW, that is, the Master or the Non-Master Sync.

At this time, in a case where the device becomes the Beaconing device, the NAN device 101 sets the function of its own Proxy Server to be enabled (S403). When the function of the Proxy Server becomes enabled, an announcement is periodically made to the NAN devices in the NAN cluster 105 that the announcement and the search of the service of the other NAN device can be performed by proxy. Hereinafter, specific processing will be described.

First, the device waits for the start of the DW (S404). When the DW arrives, the Publish message is transmitted to announce that the Proxy service is provided by the device itself (S405). In addition, the device receives the Sync Beacon transmitted from the other NAN device. Then, the Subscribe message responding to the Publish message is waited for until the end of the DW period (S406). At this time, detailed processing when the Subscribe message is received will be described with reference to FIG. 6. When the DW period is ended, the flow returns to the role decision processing.

In a case where it is determined in S402 that the device is not the Beaconing device, the function of its own Proxy Server is disabled (S407). When the function of the Proxy Server is disabled, it is determined whether or not the terminal for which the device itself performs the announcement or the search of the service by Proxy, that is, the Proxy Client is registered (S408). At this time, in a case where the already registered Proxy Client exists, the device waits for the start of the period of the DW0 (S409). That is, its own apparatus waits until the period during which the device is put into the AWAKE state. When the DW0 arrives, the device transmits a message to the already registered Proxy Client for notifying that the registration is deleted, that is, the announcement or the search of the service is not subsequently performed by Proxy (S410).

In addition, the Sync Beacon transmitted from the other NAN device is received. Thereafter, when the period of the DW0 is ended (S411), the flow returns to the role decision processing in S401. On the other hand, as a result of the determination in S408, in a case where the already registered Proxy Client does not exist, the device waits for the start of the period of the DW0 (S412), and when the DW0 is started, the Sync Beacon transmitted from the other NAN device is received (S413). Thereafter, when the period of the DW0 is ended (S414), the flow returns to the role decision processing in S401. In the example of FIG. 4, the descriptions have been provided while the Non-Beaconing device is put into AWAKE only in the period of the DW0, but the Non-Beaconing device may also be put into AWAKE in part of the DWs other than the DW0. In this case, there is a possibility that the registration deletion message transmitted in S410 may be transmitted when the message cannot be received since the Proxy Client is in the DOZE state. In view of the above, a task to send the registration deletion message may be stored, and the message may be transmitted by waiting until the DW during which the Proxy Client can receive the message.

It should be noted that the notification may be performed using the Sync Beacon instead of the notification using the Publish message in S405 indicating that the Proxy Server is enabled. Alternatively, both the notification based on the Publish message and the notification based on the Sync Beacon may also be performed. In addition, the notification of the enabling/disabling of the Proxy Server has been described depending on the presence or absence of the transmission of the Publish message, but the control on the enabling/disabling of the Proxy Server is not limited to this. For example, in a case where the Proxy Server is a disabled state, when the request of the Proxy registration is received, control may be performed such that this request is rejected. In addition, the function of the Proxy Server is included in the Publish message, but a notification of a state in which the registration cannot temporarily be performed may be issued.

Figure 5A:
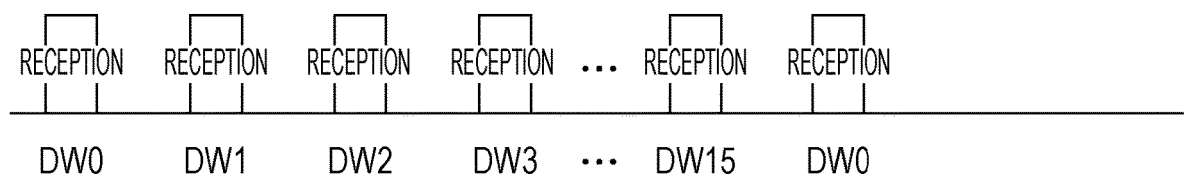
FIG. 5A illustrates an example of a relationship between a DW period and signal transmission and reception timings.
Figure 5B:
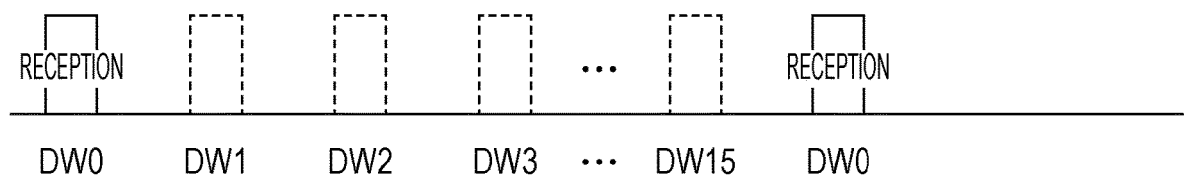
FIG. 5B illustrates an example of the relationship between the DW period and the signal transmission and reception timings.

FIGS. 5A and 5B schematically represent reception states of the wireless signal of the NAN device 101 respectively in S403 and S407. FIG. 5A corresponds to the case of S403 and illustrates a state in which the wireless signal is received in all of the DW periods. In this case, the NAN device 101 enables the reception circuit of the wireless LAN control unit 201 in all of the DW intervals, that is, in the DW0 to the DW15 to perform the reception of the wireless signal. According to this, it is possible to improve a probability that the NAN device 101 can receive the wireless signal from the other NAN device, and in a case where the wireless signal is received, the NAN device 101 can promptly respond to the wireless signal.

On the other hand, FIG. 5B corresponds to the case of S407 and illustrates a state in which the wireless signal is received only in the DW0. In this case, since the NAN device 101 does not perform the reception of the wireless signal in the DW1, the DW2, the DW3, and the like, the power consumption can be reduced by the amount corresponding to the decrease in the frequency that the reception of the wireless signal is performed in the DW period. It should be noted however that the NAN device 101 cannot receive the wireless signal transmitted from the other NAN device in the DW1, the DW2, the DW3, and the like and cannot promptly respond to the wireless signal.

Subsequently, a sequence in a case where the NAN device 101 participates in the NAN cluster 105 and operates as the Proxy Server will be described by using FIG. 6. It should be noted that the NAN device 101 does not receive the request of the proxy transmission from the other NAN device at the starting time point of the processing in FIG. 6 and does not operate as the Proxy Server. En addition, it is assumed that the NAN device 102 and the NAN device 103 participate in the NAN cluster 105, and the NAN device 104 does not participate in the NAN cluster 105. In addition, the NAN device that is not illustrated in FIG. 1 is set as the Master of the NAN cluster 105.

First, the user of the NAN device 101 activates the NAN device 101 (S601). When the NAN device 101 is activated, the NAN cluster 105 is discovered, and first, it is decided that the device operates as the Master of the NAN cluster 105 as the result of the role decision processing on the basis of S401 (S602). This is an operation based on the NAN specification indicating that the device operates as Master at the beginning immediately after the device has participated in the NAN cluster.

Then, when the device becomes the Master, it is decided that the device operates by enabling the function of the Proxy Server on the basis of S403 (S603). When the DW0 arrives, since the NAN device 101 is the Beaconing device, the Sync Beacon is transmitted on the basis of the NAN specification to announce that the DW arrives (S604). Then, the Publish message is further transmitted in the DW period to announce that the function of the Proxy Server is included (S605).

When the NAN device 102 receives the Publish message transmitted in S605 and discovers the Proxy Server, the Proxy registration request is transmitted to the NAN device 101 such that the announcement of the service is asked to be performed by proxy (S606). At this time, the NAN device 102 notifies the NAN device 101 of the DW during which the NAN device 102 itself is AWAKE after the request is performed by proxy. Herein, the NAN device 102 is put into AWAKE only in the DW0 after the Proxy request is completed. That is, AWAKE and DOZE are repeated as illustrated in FIG. 5B. Furthermore, the NAN device 102 notifies the NAN device 101 that the service of the printer can be provided.

When the NAN device 101 receives the Proxy registration request transmitted in S606, a message for notifying that the Proxy registration is completed is transmitted (S607). Hereinafter, when the NAN device 101 receives the Subscribe message for searching for the print service, a message for notifying that the NAN device 102 provides the print service is returned as a response. Furthermore, the announcement of the service is executed as a substitute for the NAN device 102 by including the information indicating that the DW during which the NAN device 102 is AWAKE is the DW0. The message for notifying that the NAN device 102 provides the print service and the NAN device 102 is AWAKE in the DW0 will be hereinafter referred to as a "proxy service announcement". This is transmitted as the Publish message.

The NAN device 101 executes the role decision processing when the DW0 period is completed, but the descriptions will be hereinafter provided while the NAN device having the higher Master Preference than that of the NAN device 101 does not exist in FIG. 6, and the NAN device 101 is regularly the Master.

When the DW1 corresponding to the next DW period arrives, the NAN device 101 functioning as the Master transmits the Sync Beacon (S608). Furthermore, the Publish message for announcing that the function of the Proxy Server is included is announced (S609). It should be noted that the proxy service announcement of the NAN device 102 may be performed herein. The Sync Beacon and the Proxy Server announcement are performed similarly also in the next DW2 (S610, S611).

Herein, it is assumed that the user of the NAN device 103 instructs the NAN device 103 to search for the printer (S612). Then, the NAN device 103 transmits the Subscribe message for searching for the print service to search for the service (S613). When the Subscribe message for searching for the print service is received, the NAN device 101 transmits the Publish message for notifying that the NAN device 102 provides the print service by proxy (S614). The NAN device 103 that has received this can find that the NAN device 102 provides the print service and also is AWAKE in the DW0 and the NAN device 103 can communicate with the NAN device 102.

Since the processing in the DW3 to 15 is similar to that in the DW1, the descriptions thereof will be omitted.

When the next DW0 arrives, the NAN device 101 executes S615 and S616 similarly as in S608 and S609. When the DW0 arrives, since the NAN device 103 is put into a communicable state with the NAN device 102, the Subscribe message corresponding to the message of the service search is transmitted to the NAN device 102 (S617). Then, the NAN device 102 transmits the Publish message for notifying that the print service is provided as the response (S618). In addition, the transmission is performed by including the setting information of the wireless LAN for using the print service in the Publish message at this time. Specifically, this is a parameter for establishing a connection by Wi-Fi Direct to use the print service by being directly communicated with the NAN device 102. Although not illustrated, the NAN device 103 executes the Wi-Fi Direct connection with the NAN device 102 on the basis of this information and actually uses the print service.

With the above-described processing, the NAN device 101 can perform the announcement of the service as a substitute for the NAN device 102. According to this, while the NAN device 102 is in the DOZE state during the period of the DW1 to 15 to reduce the power consumption, the NAN device 103 can find that the NAN device 102 includes the print service.

Next, a sequence in a case where the NAN device 104 participates in the NAN cluster 105, and the Proxy Server of the NAN device 101 is disabled will be described with reference to FIG. 7. FIG. 7 is processing after FIG. 6, where descriptions will be started in a state in which the NAN device 102 completes the Proxy request to the NAN device 101, and the NAN device 101 announces the service as a substitute for the NAN device 102.

When the NAN device 104 is activated, similarly as in S601 to S603, the NAN device 104 starts the operation as the Master of the NAN cluster 105 immediately after the NAN device 104 participates in the NAN cluster, and the function of the Proxy Server is enabled (S701, S702, S703).

Next, since both the NAN device 101 and the NAN device 104 are the Masters in the DW0, the NAN device 101 and the NAN device 104 respectively transmit the Sync Beacons (S704, S705). Furthermore, since both the NAN device 101 and the NAN device 104 are the Proxy Servers, the NAN device 101 and the NAN device 104 announce that the Proxy Server function is included (S706, S707). When the DW0 is ended, the NAN device 101 and the NAN device 104 execute the role decision processing on the basis of S401. At this time, the NAN device 104 is set to have a higher Master Preference. In this case, it is decided that the NAN device 101 operates as the Non-Master Non-Sync in the NAN cluster 105 on the basis of the NAN specification (S708). On the other hand, it is decided that the NAN device 104 continues operating as the Master in the NAN cluster 105. For this reason, the NAN device 101 disables the function of the Proxy Server in accordance with the flow chart of FIG. 4 (S709). The NAN device 101 performs the Proxy registration cancellation notification for the NAN device 102 in accordance with S410, but since the NAN device 102 cannot perform the wireless communication unless it is the DW0, the message of the cancellation notification is not transmitted until then.

When the DW1 corresponding to the next DW arrives, since the NAN device 101 is not the Master, the Sync Beacon is not transmitted. In addition, since the Proxy Server function is disabled, the Proxy Server announcement is not also executed. On the other hand, since the NAN device 104 is the Master and the Proxy Server function is enabled, the processing in S710 and S711 is executed.

The processing in the DW2 to 15 is omitted. In addition, since the processing in S712 and S713 is similar to the processing in S710 and S711, the descriptions thereof will be omitted.

When the DW0 arrives, since the Proxy function is disabled, the NAN device 101 transmits a message for cancelling the Proxy registration to the NAN device 102 (S714). When the Proxy registration is cancelled in S714, the NAN device 102 is controlled to request the other NAN device for the Proxy. Herein, since a state in which the Proxy Server function is enabled can be found from the NAN device 104 in S713, the Proxy request is executed for the NAN device 104 similarly as in S606 and S607 (S715, S716).

It should be noted that, when the Proxy request is cancelled in S714, since the NAN device 101 can completely disable the Proxy function, the AWAKE state is established only in the DW0, and DOZE is set in the other DW1 to 15 to reduce the power consumption. That is, AWAKE and DOZE are repeated as represented by a pattern in FIG. 5B.

With the above-described processing, the Beaconing device can operate as the Proxy Server, and the Non-Beaconing device can stop the operation as the Proxy Server. According to this, it is possible to reduce the occasions where the NAN device 101 is unnecessarily awake. That is, since the NAN device 104 is the Beaconing device, the NAN device 104 needs to be awake in all of the DWs. On the other hand, since the NAN device 101 is the Non-Beaconing device, the NAN device 101 does not need to be AWAKE in all of the DWs and may be DOZE in DWs other than the DW0. However, a situation where the NAN device 101 is in the AWAKE state in all of the DWs to act as the Proxy in the above-described state is not preferable from the viewpoint of the efficiency of the power consumption. Since the NAN device 104 needs to be AWAKE in all of the DWs anyway, the NAN device 104 preferably acts as the Proxy. The above-described configuration can be realized by switching the validity and invalidity of the Proxy Server depending on whether the device is the Beaconing device or the Non-Beaconing device on the basis of the flow chart of FIG. 4.

It should be noted that the announcement indicating that the function of the Proxy Server is included is may be performed by using the Sync Beacon in S704 and S705. If only the NAN device that does not include the Proxy Server function becomes the Beaconing device in the NAN cluster 105, there is a possibility that the Proxy Server does not exist in the NAN cluster 105. For this reason, only when the NAN device that operates as the Beaconing device and also includes the Proxy Server function exists, the Proxy Server function may be disabled in a case where the NAN device becomes the Non-Beaconing device.

Second Embodiment

According to the present embodiment, the NAN device 101 decides in the enabling/disabling control processing of the Proxy Server function in accordance with the number of times the NAN device 101 itself is AWAKE in the DW. Hereinafter, a point different from the first embodiment will be mainly described.

Figure 8:
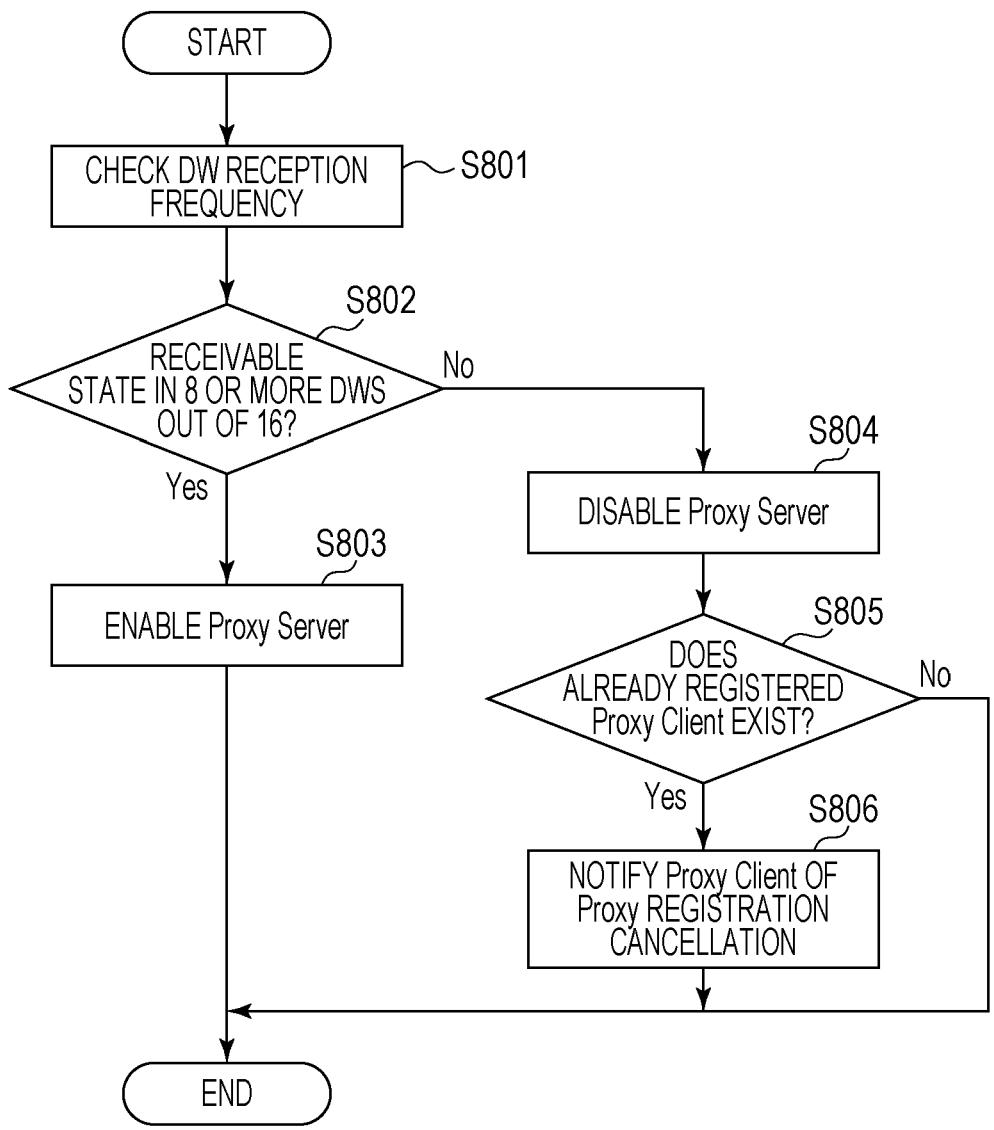
FIG. 8 is a flow chart illustrating a second example in which enabling/disabling of the Proxy Server is switched.

FIG. 8 illustrates an example of the flow of the enabling/disabling control processing of the Proxy Server function according to the present embodiment. The present processing is executed in a certain time cycle such as, for example, every 10 seconds. In addition, the flow chart illustrated in FIG. 8 illustrates a flow of the processing performed when the control unit 302 of the NAN device 101 reads out and executes the computer programs stored in the storage unit 301. It should be noted that a configuration may also be adopted in which part or all of the steps illustrated in the flow chart illustrated in FIG. 8 is realized by the hardware such as, for example, the ASIC (Application Specific Integrated Circuit).

First, the DW reception frequency is checked (S801). This is decided on the basis of a battery remaining amount of the NAN device 101 as illustrated in FIG. 9.

As a result of S801, in a case where a state is established in which the reception can be performed at a frequency of DWs higher than or equal to 8 times out of 16 times, that is, a case where the battery remaining amount is 50% to 100% as illustrated in FIG. 9, Yes is the result in S802. On the other hand, in a case where the battery remaining amount is 49%, No is the result in S802. In a case where Yes is the result in S802, the Proxy Server function is enabled (S803). On the other hand, in a case where No is the result in S802, the Proxy Server function is disabled (S804). Since the processing in S805 and S806 is similar to that in S408 to S410, the descriptions thereof will be omitted. In a case where the Proxy Server function is enabled in S803, the Proxy Server announcement and the service proxy response if the Proxy Client is already registered are executed in the DW during which the device itself is AWAKE similarly as in the first embodiment. It should be noted that the relationship between the battery remaining amount and the reception DW frequency which is illustrated in FIG. 9 is an example and is not limited to this. In addition, the value of the threshold in S802 is also an example, and a condition other than 8 times out of 16 times may also be used.

In this manner, in the processing in FIG. 8, the Proxy Server function is enabled in a case where the number of the DWs corresponding to AWAKE among the plurality of DWs, that is, the DWs during which the Sync Beacon or the like is transmitted or received is higher than or equal to a predetermined number, and the Proxy Server function is disabled in a case where the number of the DWs corresponding to AWAKE is lower than the predetermined number. Therefore, the NAN device 101 is more likely to operate as the Proxy Server when the frequency corresponding to the AWAKE state is high. According to this, since the frequency at which the service proxy response can be performed is relatively increased by enabling the Proxy Server only in a case where the frequency corresponding to the AWAKE state is high, the other NAN device is more likely to discover the service.

It should be noted that in a case where whether to enable or disable the Proxy Server function is decided in S802, the decision is preferably made also on the basis of an AWAKE frequency of the other NAN device including the Proxy Server function. That is, the Proxy Server function is enabled even in a state in which the reception can be performed fewer than 8 times out of 16 times in the case of the highest frequency for being AWAKE among the other NAN devices including the Proxy Server function. In contrast, the Proxy Server function is disabled even in a state in which the reception can be performed more than or equal to 8 times out of 16 times in a case where the NAN device having the high frequency for being in the AWAKE state exists with regard to the other NAN device including the Proxy Server function.

According to this, only the NAN device which is AWAKE in the DWs at the higher frequency can enable the Proxy Server. Then, the other NAN device can avoid the execution of the Proxy Server announcement or the like by disabling the Proxy Server function and reduce the power consumption.

Figure 6:
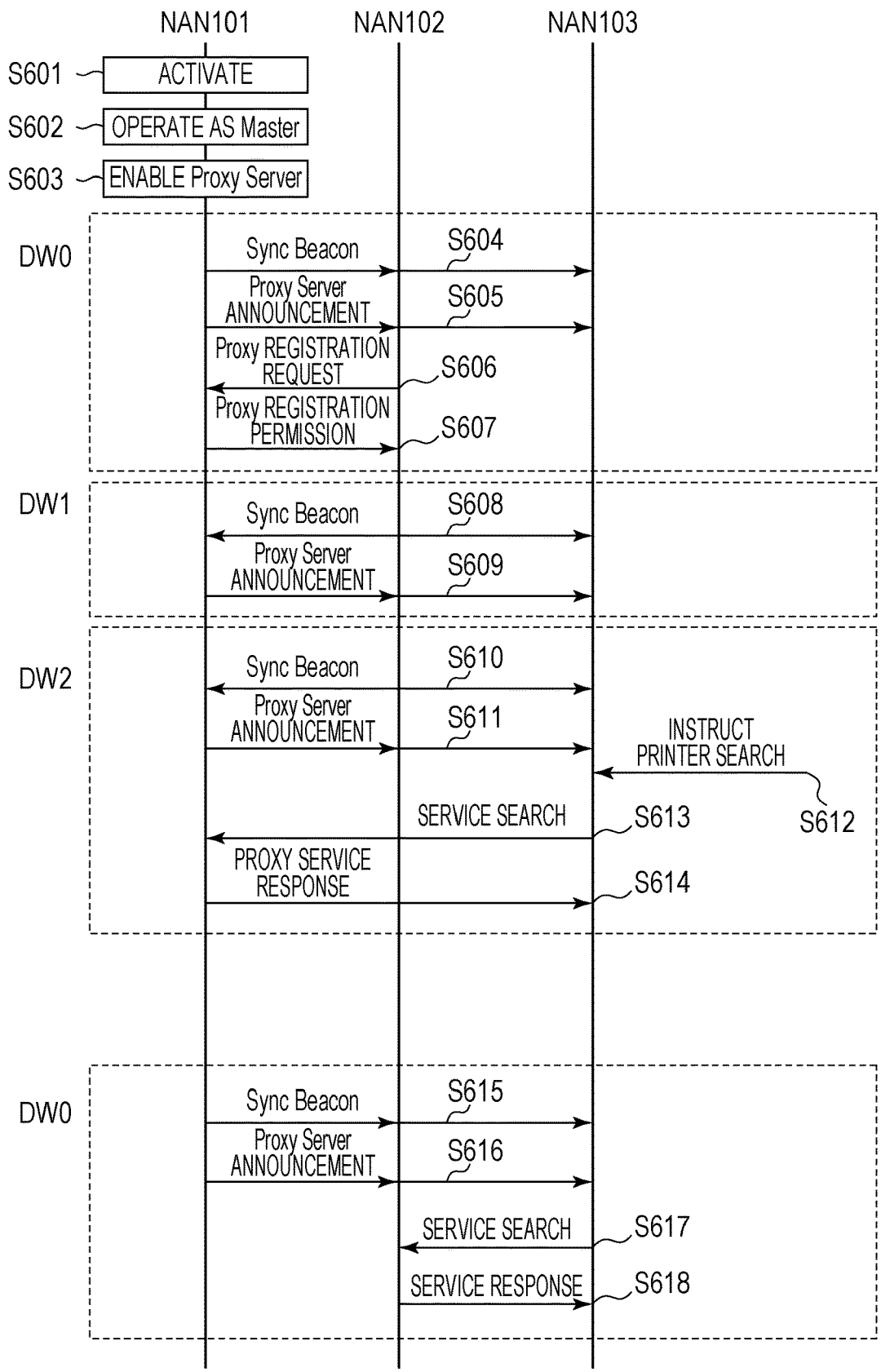
FIG. 6 is a sequence diagram illustrating a first example of a flow of Proxy request processing.
Figure 7:
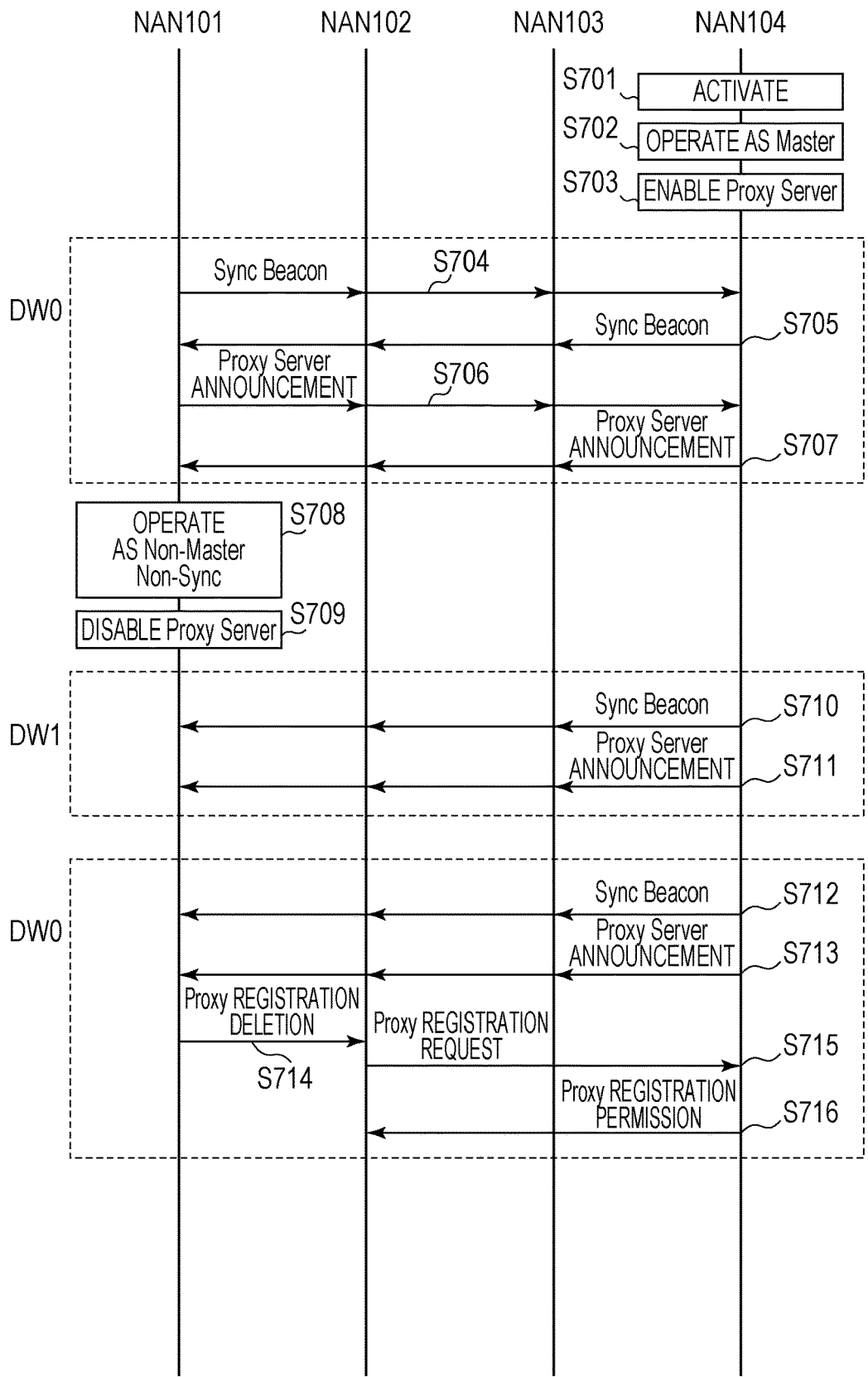
FIG. 7 is a sequence diagram illustrating the first example of the flow of the Proxy request processing in a case where a NAN device 104 has participated.

Since the processing after the Proxy Server is enabled, the detailed sequence in a case where the Proxy request has arrived, and the processing for disabling the Proxy Server function are similar to those in FIGS. 6 and 7, and descriptions thereof will be omitted.

Third Embodiment

According to the present embodiment, the NAN device 101 is different from the first embodiment, and only the NAN device having the role of the Master enables the Proxy Server function. Hereinafter, a point different from the first embodiment will be mainly described.

Figure 10:
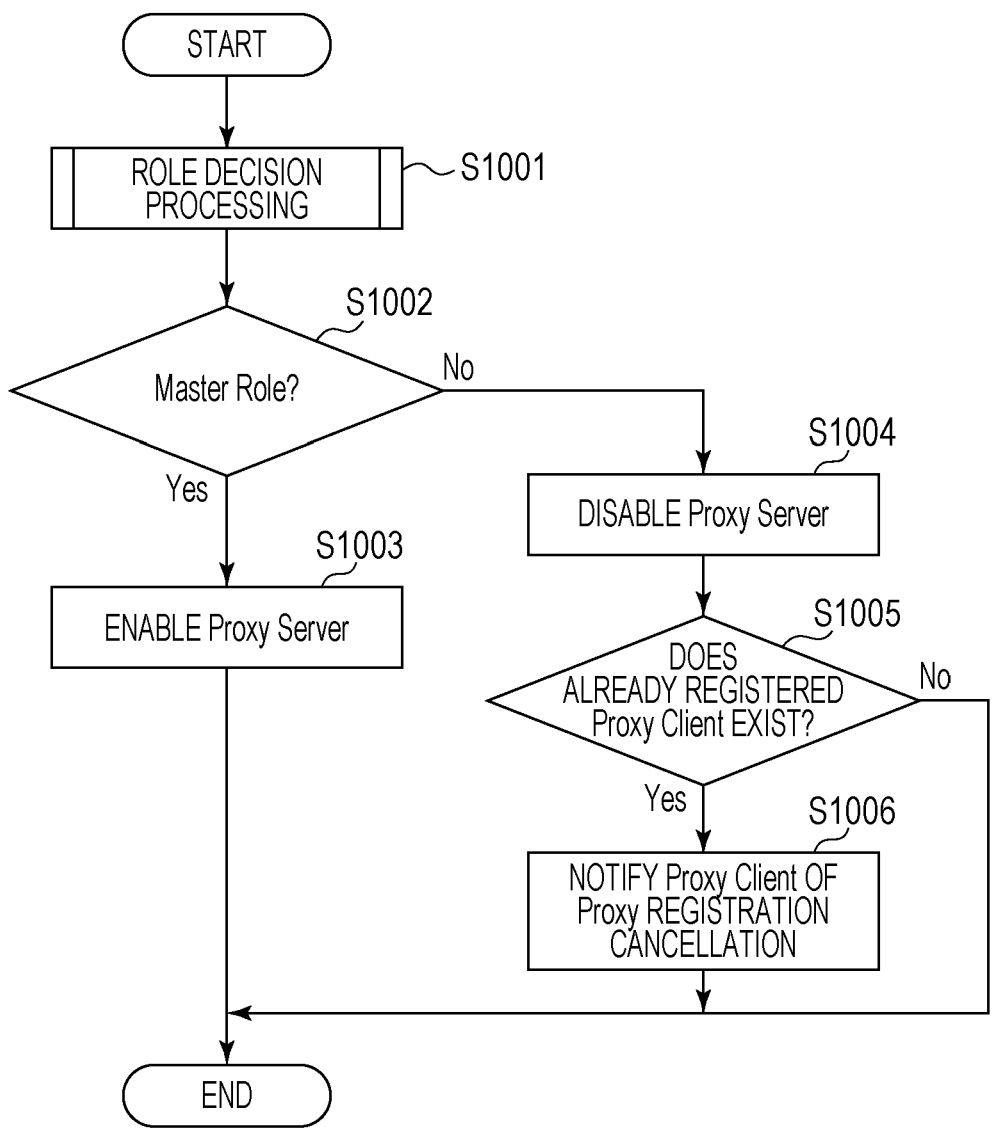
FIG. 10 is a flow chart illustrating a third example in which enabling/disabling of the Proxy Server is switched.

FIG. 10 illustrates an example of the flow of the enabling/disabling control processing of the Proxy Server function according to the present embodiment. The present processing is set to be executed each time the DW during which its own device is AWAKE is ended. In addition, the flow chart illustrated in FIG. 10 illustrates a flow of the processing performed when the control unit 302 of the NAN device 101 reads out and executes the computer programs stored in the storage unit 301. It should be noted that a configuration may also be adopted in which part or all of the steps illustrated in the flow chart illustrated in FIG. 10 is realized by the hardware such as, for example, the ASIC (Application Specific Integrated Circuit).

A different point in S1001 to S1006 in the flow of FIG. 10 from FIG. 4 according to the first embodiment is a point that the decision is made depending on whether or not the device is the Master (S1002) instead of enabling or disabling the Proxy Server function depending on whether or not the device is the Beaconing device in S1002.

According to this, only the Master can enable the Proxy Server function. As compared with the first embodiment, since the Non-Master Sync does not enable the Proxy Server function, the NAN devices that enable the Proxy Server function can be further narrowed down. For this reason, there is a possibility that the number of NAN devices that can further reduce the power consumption may be increased.

Fourth Embodiment

According to the present embodiment, the NAN device 101 controls as to whether the NAN device enables or disables the Proxy Server function depending on a transmission and reception frequency of the service provided or announced by its own device as being different from the first embodiment. Hereinafter, a point different from the first embodiment will be mainly described.

Figure 11:
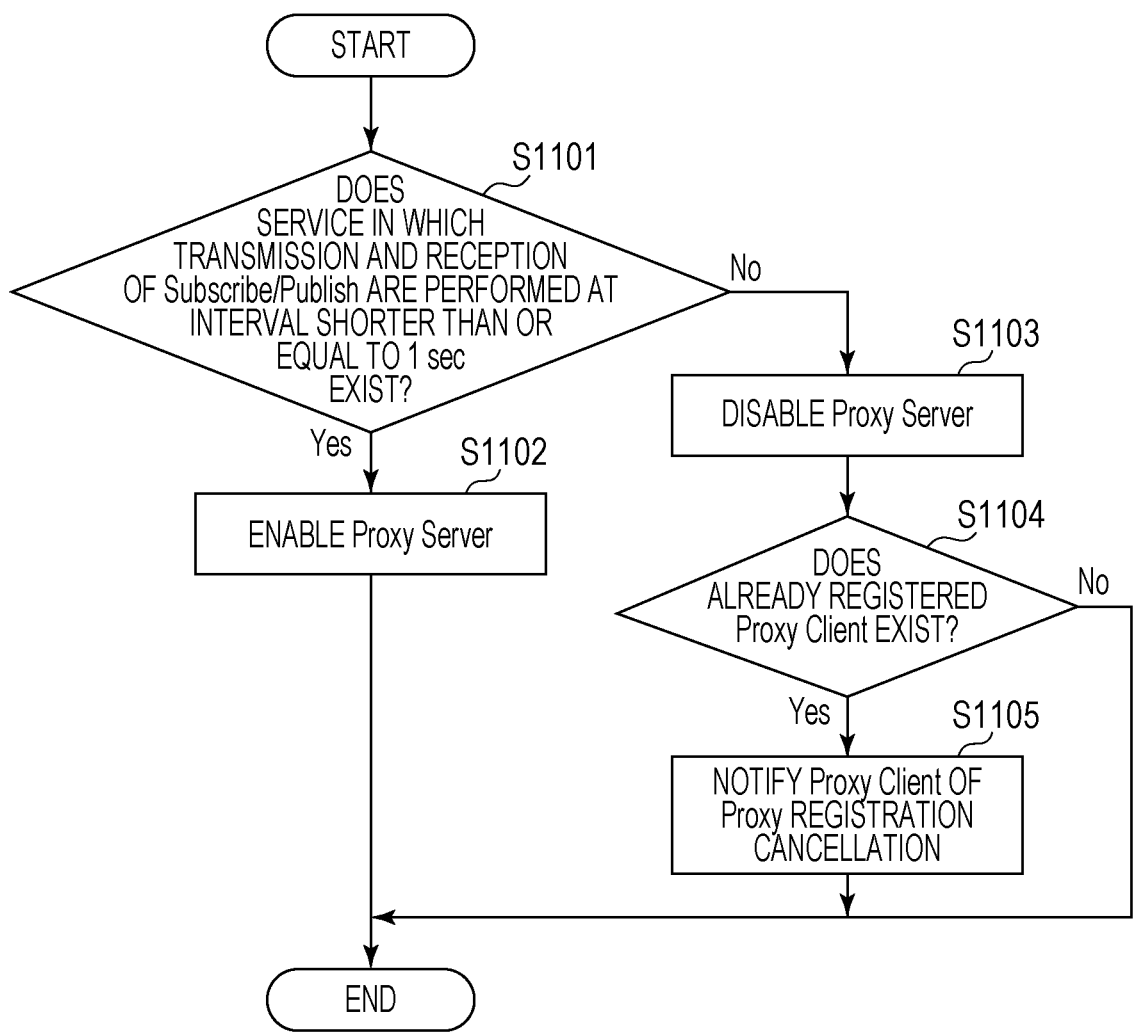
FIG. 11 is a flow chart illustrating a fourth example in which enabling/disabling of the Proxy Server is switched.

FIG. 11 illustrates an example of the flow of the enabling/disabling control processing of the Proxy Server function according to the present embodiment. The present processing is set to be executed in a certain time cycle such as, for example, every 10 seconds. In addition, the flow chart illustrated in FIG. 11 illustrates a flow of the processing performed when the control unit 302 of the NAN device 101 reads out and executes the computer programs stored in the storage unit 301. It should be noted that a configuration may also be adopted in which part or all of the steps illustrated in the flow chart illustrated in FIG. 11 is realized by the hardware such as, for example, the ASIC (Application Specific Integrated Circuit).

First, it is determined whether or not the service that transmits or receives Subscribe or Publish in an interval shorter than or equal to 1 second exists (S1101). The service mentioned herein is a service of a target to be announced or searched for in the NAN cluster and is a service that is Subscribed or Published in the DW approximately at the above-described frequency.

FIG. 12 illustrates an example of a type of the service that may be announced or searched for and a transmission and reception frequency of the service in the NAN device 101. The transmission and reception frequency varies in the chat service corresponding to the same service depending on an active operation or a background operation. Herein, the active operation refers to a state in which an application that realizes the chat service is displayed on the output unit 305. The background operation refers to a state in which the chat service is operated in a state in which the application is not displayed on the output unit 305.

As a result of S1101, in a case where the service that Publishes/Subscribes at a frequency lower than or equal to 1 second is activated, that is, as illustrated in FIG. 12, when a chat application is in the active operation, Yes is the result in S1101. On the other hand, in a case where the chat application is in the background operation or a coupon service is operated, No is the result in S1101. Since S1102 to S1105 corresponding to the subsequent processing are similar to S802 to S805, the descriptions thereof will be omitted.

It should be noted that in a case where it is decided whether to enable or disable the Proxy Server function similarly as in the second embodiment, the decision may be made also on the basis of the AWAKE frequency of the other NAN device including the Proxy Server function. According to the above, only the NAN device including the service announced or searched for by its own device and the Proxy Server function having the high AWAKE frequency as a result can enable the Proxy Server function. The other NAN device can avoid the execution of the Proxy Server announcement or the like and reduce the power consumption by disabling the Proxy Server function.

The processing after the Proxy Server is enabled, the detailed sequence in a case where the Proxy request has arrived, and the processing for disabling the Proxy Server function are similar to those in FIGS. 6 and 7, and descriptions thereof will be omitted.

Fifth Embodiment

According to the present embodiment, the NAN device 101 performs control as to whether the NAN device enables or disables the Proxy Server function depending on a type of the service provided or announced by its own device as being different from the fourth embodiment. Hereinafter, a point different from the fourth embodiment will be mainly described.

FIG. 13 illustrates an example of a table representing a correlation between an activated service and enabling/disabling of the Proxy Server function according to the present embodiment. The Proxy Server function is enabled only when the chat service is active, and the Proxy Server function is disabled in the other service. It should be noted however that, in a case where the chat service is active and also both the coupon services are activated, the enabled one is prioritized, and the Proxy Server function is enabled. It should be noted that the transmission and reception frequencies of the respective services are similar to those of the fourth embodiment, and the Proxy Server function is enabled in a case where the service having the high transmission and reception frequency is operated. For this reason, the function as the Proxy Server is enabled when the service that needs to be in the AWAKE state is operated, and AWAKE is set to be in all of the DWs, so that the efficiency of the power consumption is satisfactory.

Other Embodiments

According to the above-described embodiment, the case where the NAN device 101 operates as the Proxy Server that responds by proxy with regard to the notification of the service provided by the NAN device 102 has been described. However, the target of the proxy transmission by the Proxy function is not limited to the information of the service that can be provided. For example, the NAN device 101 may accept a request for searching for the service by the other device and may search for the service as a substitute for the device. In this case, for example, the NAN device 101 may transmit the Subscribe message by the other device by proxy and receive the Publish message corresponding to the response to search for the service. It should be noted that the NAN device 101 may further wait for the Publish message transmitted (for example, voluntarily) by another device instead of transmitting the Subscribe message. In either case, the NAN device 101 can notify the device that has requested the proxy of the search for the service of the search result in the DW period during which the device can receive the wireless signal.

In addition, according to the above-described embodiment, the case has been described where the NAN device 101 accepts only the Proxy request from the NAN device 102 but may also accept the Proxy requests from the other one or more NAN devices.

In addition, according to the respective embodiments, in a case where the condition for enabling or disabling the Proxy Server is matched, validity and invalidity may be switched in a case where the relevant condition continues for a certain period instead of immediately switching validity and invalidity. For example, the switching between validity and invalidity of the Proxy Server is performed depending on the condition in S402 in FIG. 4, but control may be performed in a manner that the Proxy Server is enabled in a case where the state of being the Beaconing Device continues for a certain period (for example, 10 minutes or the like). In a case where entry and exit of the NAN devices frequently occur in the NAN cluster, when the switching between validity and invalidity of the Proxy Server is performed immediately after the device becomes the Beaconing device, there is a possibility that the switching between validity and invalidity of the Proxy Server frequently occurs. This is effective in the above-described case.

In addition, the above-described respective embodiments can be appropriately combined with each other, and a configuration may also be adopted in which the user can select on the basis of which embodiment the NAN device operates In addition, the present invention is also realized by executing the following processing. That is, the processing is performed in which software (program) that realizes one or more functions of the above-described embodiments is supplied to a system or an apparatus via a network or various storage media, and one or more computers (CPUs, MPUs, or the like) of the system or the apparatus reads out the program to be executed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus to perform, in synchronization with other communication apparatuses, communication in a Discovery Window (DW) that is compliant with Neighbor Awareness Networking (NAN) standard, the communication apparatus comprising:

one or more processors; and one or more memories including instructions that, when executed by the one or more processors, cause the communication apparatus to perform operations including:

deciding whether or not to perform proxy processing in which at least one process of a transmission or a reception of a wireless signal is performed in the DW as a substitute for a particular communication apparatus belonging to a NAN cluster among which the DW is synchronized, wherein the communication apparatus performs the proxy processing as the substitute for the particular communication apparatus in a case where the communication apparatus operates as a Master in the NAN cluster and does not perform the proxy processing as the substitute for the particular communication apparatus in a case where the communication apparatus operates as a Non-Master Sync or a Non-Master non-Sync in the NAN cluster.

2. The communication apparatus according to claim 1, wherein the wireless signal includes a signal indicating a service provided by another communication apparatus.

3. The communication apparatus according to claim 1, wherein the wireless signal includes a signal for searching for a service provided by another communication apparatus.

4. The communication apparatus according to claim 1, wherein the particular communication apparatus is a communication apparatus that has requested the communication apparatus to perform the proxy processing.

5. A method for a communication apparatus to perform, in synchronization with other communication apparatuses, communication in a Discovery Window (DW) that is compliant with Neighbor Awareness Networking (NAN) standard, the method comprising:

deciding whether or not to perform proxy processing in which at least one process of a transmission or a reception of a wireless signal is performed in the DW as a substitute for a particular communication apparatus belonging to a NAN cluster among which the DW is synchronized, wherein the communication apparatus performs the proxy processing as the substitute for the particular communication apparatus in a case where the communication apparatus operates as a Master in the NAN cluster and does not perform the proxy processing as the substitute for the particular communication apparatus in a case where the communication apparatus operates as a Non-Master Sync or a Non-Master non-Sync in the NAN cluster.

6. A non-transitory computer-readable storage medium storing a program to cause a computer to perform a method for a communication apparatus to perform, in synchronization with other communication apparatuses, communication in a Discovery Window (DW) that is compliant with Neighbor Awareness Networking (NAN) standard, the method comprising:

deciding whether or not to perform proxy processing in which at least one process of a transmission or a reception of a wireless signal is performed in the DW as a substitute for a particular communication apparatus belonging to a NAN cluster among which the DW is synchronized, wherein the communication apparatus performs the proxy processing as the substitute for the particular communication apparatus in a case where the communication apparatus operates as a Master in the NAN cluster and does not perform the proxy processing as the substitute for the particular communication apparatus in a case where the communication apparatus operates as a Non-Master Sync or a Non-Master non-Sync in the NAN cluster.

* * * * *